Feb. 8, 1938. W. SALEMME 2,108,023
METHOD AND APPARATUS FOR MAKING TUBES OF THERMOPLASTIC DERIVATIVES
Filed May 24, 1934 2 Sheets-Sheet 2
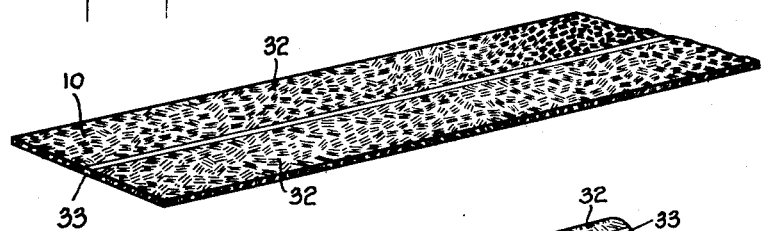
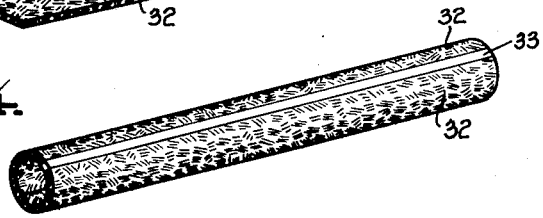
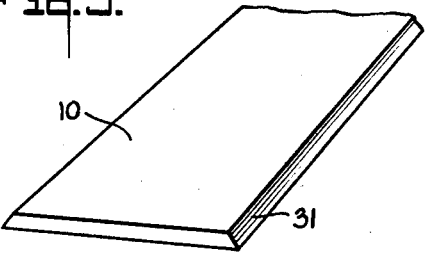
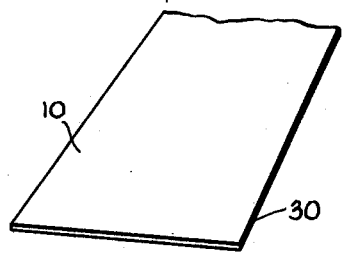
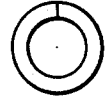
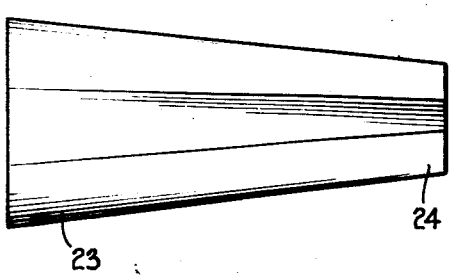
INVENTOR
William Salemme
BY
ATTORNEYS Patented Feb. 8, 1938

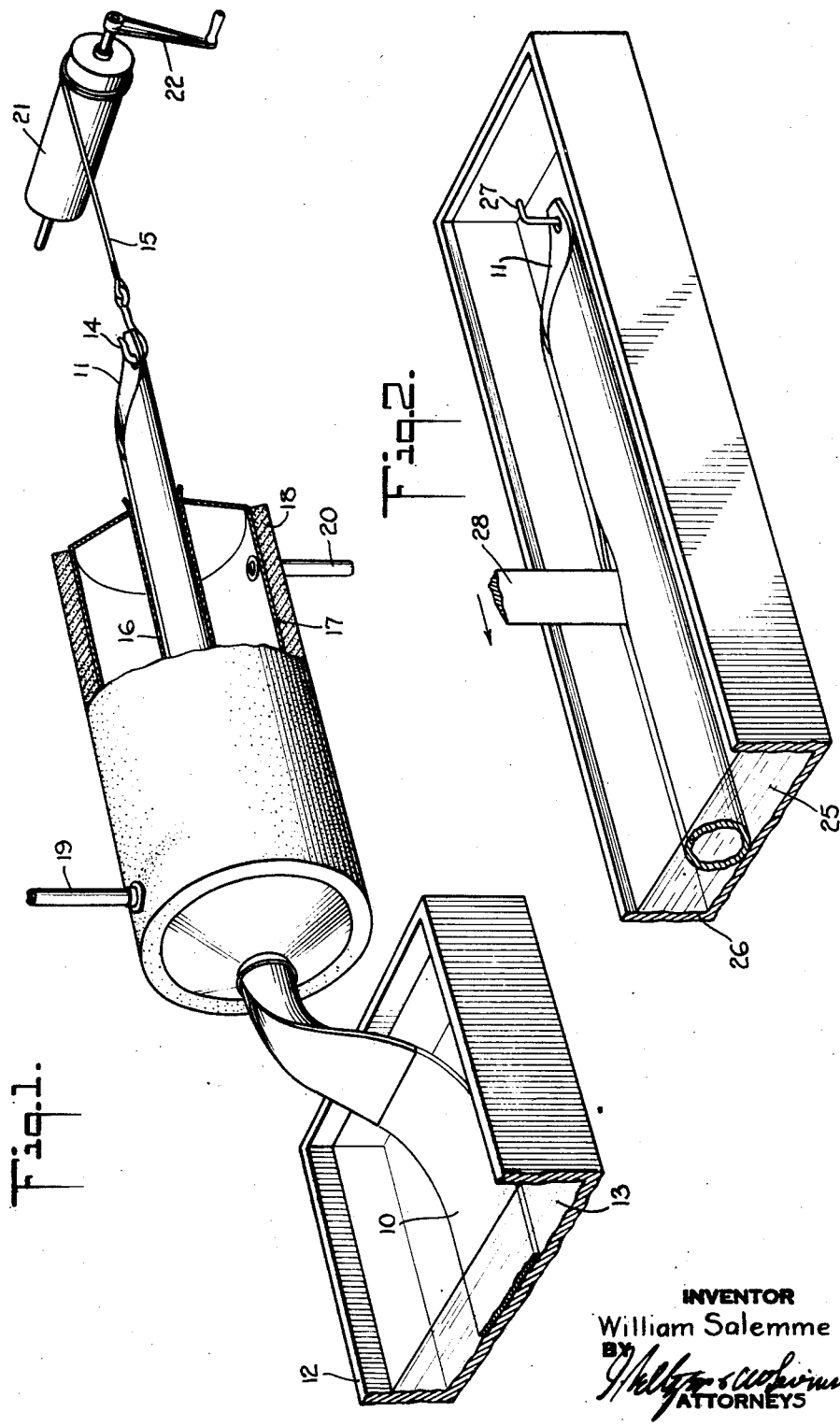

2,108,023

UNITED STATES PATENT OFFICE 2,108,023

METHOD AND APPARATUS FOR MAKING TUBES OF THERMOPLASTIC DERIVATIVES

William Salemme, West Orange, N. J., assignor to Celluloid Corporation, a corporation of New Jersey Application May 24, 1934, Serial No. 727,210

9 Claims. (Cl. 18—3)

This invention relates to tubes such as fountain pen and pencil barrels, wire conduits, etc. and to cylindrical tubes for blowing into irregular shaped articles such as brush handles, etc., that contain a thermoplastic composition which may comprise a derivative of cellulose with or without a plasticizer.

An object of the invention is the economic and expeditious production of tubes from thermoplastic derivatives of cellulose. Another object of the invention is the method of producing tubes that permits the obtaining of effects in coloration, shape etc. which has heretofore been desired but impracticable to produce. Other objects of the invention will appear from the following detailed description.

In the drawings wherein like numbers refer to the same or corresponding elements:

Fig. 1 is a perspective view partly in section of a device constructed according to this invention.

Fig. 2 is a perspective view of a device for cementing the edges of a formed tube.

Fig. 3 is a perspective view of a sheet of material containing a window strip.

Fig. 4 is a perspective view of a tube formed according to this invention and containing the window strip.

Fig. 5 is a perspective view of a sheet having angled sides for obtaining a "butt" joint in the formed tube when working with heavy or thick material.

Fig. 6 is an end view of a tube formed of a sheet having angled edges.

Fig. 7 is a perspective view of a thin sheet having right angled edges.

Fig. 8 is an end view of a tube formed from a sheet as shown in Fig. 7.

Fig. 9 is a side view of an optional shaping member to be used in the device shown in Fig. 1.

Fig. 10 is an end view of the shaping member shown in Fig. 9.

Tubes from thermoplastic derivatives of cellulose or cellulose derivatives made thermoplastic by means of plasticizers have been made by molding the same in dies, winding a sheet in roll form on a mandrel while immersed in a solvent bath, by spirally winding a strip on a mandrel and by extrusion, all of which require a skilled operator and are cumbersome. This invention, however, is much simpler and is capable of producing effects in the finished articles not heretofore attainable. Thus, this invention renders possible many configurations which could not be obtained before with rod stock or sheet stock by the extrusion or casting methods.

The spiral tube was not satisfactory for certain purposes on account of the spiral seam. A straight line or lateral seam is less conspicuous, but the molding methods generally prescribed for accomplishing this are not practical or feasible. The fins of the two molded seams have to be scraped off, smoothed and the joint is oftentimes quite weak, owing to the lack of cement during the molding operation. The molded seams also show a strained condition which manifests itself in unevenness when the tube is subjected to any high temperatures, such as hot water. When molded articles from which the fins have been scraped are immersed in hot water, there is a tendency for the tube to collapse, which reveals the strained condition. In the case of spiral tubing it is necessary to apply uniform tension or twist to insure good welding. The result is that the production of satisfactory tubing depends almost entirely upon the operator's technique. This invention is less subject to the personal element. It makes a very strong tube, which can be demonstrated by the fact that a tapered steel mandrel hammered into the tube fails to pry it open and also by the fact that the tube may be immersed in boiling water for long periods of time without collapsing at the seam. Furthermore, this invention is unlimited in the size of tubes that may be formed. Thus, the method can be applied to the manufacture of tubes of from below $\frac{1}{16}$ of an inch in diameter and .0075 inch in gauge to tubes of above 2½ inches in diameter and .25 inch in thickness. Gauge of sheet stock and diameter of tubing are not necessarily dependent on each other. By this invention a small diameter tube may be made of heavy stock and a large diameter tube may be made of thin gauge stock.

According to my invention I cut or form a strip of a thermoplastic material, especially a thermoplastic derivative of cellulose, of the width equal to the circumference of the desired tube. This strip of material is immersed in water or other suitable heating medium until the material is sufficiently soft to readily bend and remain bent without a tendency to spring back to original position. When the thermoplastic strip is sufficiently soft, which ordinarily requires only a few minutes in boiling water, it is drawn by one end, which is preferably tapered and bored, by any suitable means such as by a strong wire, and pulled steadily through a cold water jacketed metal tube whose diameter and internal configuration is varied according to the size and shape of the tube desired. In making tubes of heavy gauge strips, the sides of the strips are preferably cut at an angle or scarfed to form a full edge to edge abutment when twisted to a tube shaped article. Owing to the total immersion of the strip in hot water, there is no stress or strain along the edges. After forming, the tubes are dried and may then be cemented by immersing, or at least immersing the seam of, the tube lengthwise in a trough bath filled with a solvent for the material and opening the seam with a blade to insure the penetration of the solvent into the seam. Instead of a solvent, any other adhesive agent may be employed. The formed tube may then be allowed to dry and may be subjected to any of the finishing operations such as straightening and/or stretching over a mandrel, drawing and grinding. The drawing operation may be merely redrawing the tube through a device similar to the one in which it was formed or the tube may be stretched over a mandrel, the loaded mandrel being then inserted in a container, pipe, etc. through which steam is circulated to render the tube soft. The tube and mandrel are then pulled through a cold water jacketed tube of a diameter less than the formed tube after which the tube is removed from the mandrel.

The stretching operation may be performed in a similar device to the tube forming device. That is, the softened tube is drawn through a cold metallic tube of a diameter less than that of the formed tube. This stretching operation is also applicable to the smoothing out and reducing the diameter of solid rods which are softened with heat and pulled through the cold jacketed cylinder in the same manner as the tubes.

Further, according to my invention I construct a device that is efficient and is both simple to make and use, which device in part resembles an ordinary laboratory condenser with the ends of the tube cut off near the jacketed portion. There may also be provided a bath or oven or other means for supplying the necessary heat to soften the thermoplastic material and a second bath for cementing the formed seams. Any suitable means may be used for drawing the tubes through the jacketed shaping cylinder.

All parts of the device that come in contact with the thermoplastic material or the reagents used therewith, such as the bath containers, the shaping cylinder, etc., may be made from stainless steel or steel coated with a protective alloy or metal such as chromium, nickel and the like.

Any suitable thermoplastic material may be shaped to a tube by this invention. The thermoplastic derivatives of cellulose, however, lend themselves especially well. Under the term thermoplastic derivatives of cellulose may be included cellulose nitrate, organic esters of cellulose, cellulose ethers and the mixed ethers and/or esters of cellulose. Examples of organic esters of cellulose are cellulose acetate, cellulose formate, cellulose propionate and cellulose butyrate, while examples of cellulose ethers are methyl cellulose, ethyl cellulose and benzyl cellulose. Such mixed esters may be employed as the nitrocellulose acetate. Also mixtures of two or more derivatives of cellulose may be employed in the same plastic material, for example, a mixture of cellulose acetate and cellulose nitrate.

The cellulose derivative may contain plasticizers to make them more readily susceptible to the action of heat. The plasticizer may be any suitable one for the particular cellulose derivative or mixture of cellulose derivatives employed.

The plasticizers may be any of the high boiling solvents or softening agents as, for example, the aryl sulphonamides such as para ethyl toluol sulphonamide, the alkyl phthalates such as dimethyl phthalate, the dialkyl tartrates such as dibutyl tartrate, the alkoxy esters of polybasic organic acids such as diethyoxy ethyl phthalate, the polybasic acid esters of the monoalkyl ethers of polyhydric alcohols such as diethylene glycol ethyl ether ester of phthalic acid, the alkyl esters of phosphoric acid such as triethyl glycol phosphate, the aryl esters of phosphoric acid such as tricresyl phosphate, the mixed alkyl and aryl phosphates, and camphor. The plasticizers may be used alone or in combination with other plasticizers. The quantity of plasticizers employed may vary within very great limits, say, from 10 to 75 parts by weight per 100 parts of the cellulose derivative in the finished product.

The plastic material may contain besides the derivative of cellulose and plasticizer, effect materials such as pigments, filling materials, soluble or insoluble dyes or lakes, fire retardants, sizes and oily materials. Examples of pigments and filling materials are metallic salts and oxides such as titanium oxide, zinc oxide, mercurous chloride, bismuth oxy chloride, powdered metal such as powdered aluminum and bronze, powdered nonmetallic substances such as logwood and lampblack, and fish scale. Examples of fire retardants are beta chlornaphthalene, triphenyl phosphate and tricresyl phosphate. Examples of sizes are the waxes, resins and synthetic resinous material. Examples of the oily materials are the animal, vegetable and mineral oils such as castor oil, olive oil, neat's-foot oil and petroleum jelly, glycerine, glycols and the derivatives and substitution products of the polyhydric alcohols.

The strips of thermoplastic material may be cut from any suitable sheets or slabs. The strips may be transparent, translucent or opaque and may be colorless or may have any suitable pigment, dye or effect material incorporated therein to produce mottled, variegated or other differential effects or a pearl-like or nacreous appearance. Instead of using stock entirely of the same material, there may be used composited or laminated plastic sheets, making it possible to obtain various artistic effects, such as pearl, cloisonne, snakeskin and the like, which cannot be obtained in any other manner. This modification also makes it possible to use as base stocks, materials which would be unsuitable for surface effects because of color or inferiority of stock, but which, by means of overlays, can be made to present an agreeable surface or color.

The composite sheets or strips for use in making tubes in accordance with the present invention may be produced in any suitable manner. For example, a pearl, onyx or any suitably colored or patterned effect is veneered with a sheet of colored or colorless transparent nitrocellulose, cellulose acetate or other cellulose derivative so that in the subsequent operations the transparent sheet will protect the under-layer containing the pattern or color effect. Also a transparent sheet of about 20 one thousandths of an inch may be composited over a fabric containing a design and a base sheet of material of any color to make up a total thickness of 60 one thousandths of an inch. The fabric may be replaced by a lithographed thin sheet or by a celluloid or similar sheet previously impressed with a finish such as morocco or snakeskin. Further, the sheets and slabs may be formed by any other suitable process as more fully described in U. S. Patents 1,864,794, 1,812,283, 1,814,641, 1,845,457, 1,899,053 and 1,920,118 and U. S. patent applications Nos. 363,692, 598,479 and 717,268.

The strips 10 of suitable width, thickness and length are tapered at one end as shown at 11 in Fig. 1. They are then placed in a tank 12 containing a liquid 13 that has little or no chemical action on the thermoplastic derivative or other ingredients of the strip material. The liquid may be water or other suitable liquid. Means, not shown, such as an electric resistance or inductance coil, steam coil, open flame or other means may be employed for raising and maintaining the liquid at an elevated temperature, which temperature will depend upon the softening temperature of the thermoplastic material.

The strip material after being softened is attached, as by a hook 14, a tong member, or other gripping element, to a cable 15 or other suitable drawing element. The cable or drawing member is then caused to pull the strip through a metal tube 16 that is cooled by a fluid flowing through a space formed by a jacket 17 surrounding tube 16. The jacket is preferably insulated with a coating of asbestos 18, cork or other suitable coating and is equipped with an entrance 19 and exit 20 for circulating within the space between the jacket and the tube 16 a cold fluid that may be water, brine or other suitable cooling agent. The cable or drawing member 15 may be caused to exert an even pull on the strip by winding said cable on a roll 21 by means of the hand crank 22, which in working on long strips, may be supplanted by an electric motor or other suitable source of positive power, or by a weight attached to one end of the cable which is passed over a pulley.

The metallic shaping tube 16 may be tapered or funnel shape for a short distance at the entrance end to permit easy threading of the cable and strip thereto. The tapered part is preferably short such that the material is immediately chilled as soon as it has reached its desired shape. The shaping tube may be round in cross section as shown in Fig. 1, or it may be elliptical, square, polygonal, heart shape, etc. If desired, tubes with more elaborate cross sections may be formed by employing a shaping tube, as shown in Figs. 9 and 10, which is round at the entrance end 23 and any suitable shape at the exit end 24, for example, star shaped.

After the strip material is formed into a tube, it may be submerged in a solvent bath 25 contained in a suitable trough 26 having means 27 for holding the tapered end 11 of the tube. While the tube is submerged in the solvent, a blade 28 may be drawn along the tube to momentarily open the seam and allow the abutting edges of the thermoplastic derivative to come in contact with the solvent. The blade is easily inserted in the seam by reason of the tapered end 11 of the tube. The tube being set and free of stresses and strains due to its method of formation closes tightly together again at the rear of the blade. Instead of employing a solvent bath, there may be employed an adhesive in the form of a liquid or paste which may be applied onto the edges immediately back of the blade. When employing a solvent bath, the tube upon springing back to closed position, after the passing of the blade, forms a perfect weld which upon drying becomes as stout as the remaining part of the tube.

After treatment in the solvent liquid or cementing material, the tube may be seasoned in a normal manner. Examples of suitable solvent material are chloroform, acetone, a mixture of acetone and ethyl or methyl alcohol, ethylene dichloride, a mixture of ethylene dichloride and ethyl or methyl alcohol, and a mixture of methyl chloride and ethyl or methyl alcohol. Examples of cementing materials that may be applied on the opened edges are solutions of organic derivatives of cellulose, vinyl resin products, cresylic resin products and rubber containing adhesives.

When forming tubes of relatively thin sheets, the sides of the strip may be cut at right angles to the face of the strip, as shown at 30 on Fig. 7, which will form a full radial abutting joint as shown in Fig. 8. However, when forming tubes of relatively thick sheets, the sides of the strip should be scarfed as at 31 on Fig. 5 such that when the strip is curved the full width of the edge will contact with the opposite edge as shown in Fig. 6 in a radial joint.

For tubes that are to contain liquids or powders such as fountain pen barrels, etc., a block may be formed of three layers of differing composition, the middle layer being a clear transparent material. This block is then sliced to form strips used in making tubes. In this way a tube of opaque highly decorative material may be formed that has a transparent window running lengthwise thereof allowing visibility into the tube. Thus, in Fig. 3 is shown a strip composed of two opaque side strips 32 joined by a highly transparent strip 33. When such a strip is formed into a tube the transparent strip forms a window through which the height of material in the tube may be located.

The device may be operated as a single unit or a tank of, say boiling water, may be provided at the ends of a battery of the cold water jacketed shaping types. All the operator has to do is hook the cables through the holes in the tapered ends of the strips and the wires pulled with an even tension by suitable means. The shaping tubes may vary from 6 inches to 2 feet or more in length, depending upon the type and weight of the material worked. It is highly important that the softened, heated thermoplastic strip be immediately cooled as it enters the coolers to prevent any stretching and for preventing the development of stresses. Therefore, it is essential that there be good circulation of cooling fluid surrounding practically the entire length of the tube, particularly at the entrance end.

When making optical tubing it is not necessary to apply cement to close the seam. The optician buys the tubing with open seam, inserts the metal rim or rod and then immerses the entire article in a solvent. The optical tubing thus made is unique and attractive as it may present an all-over pearl or decorative surface not present in stuffed rods. A further method of forming a rod covered article is to feed the metallic rod simultaneously with the strip to the shaping tube such that the thermoplastic strip is wrapped around the metal rod.

Tubes made according to this invention lend themselves admirably to blowing shaped articles or forming operations, making possible many configurations which are entirely new, particularly for shaving brush handles and like objects. Pearl stripes or laminations and the luster of same are uniform all-around and the seam is very hard to detect. These shaped, blown or tube formations may be used for fountain pens, towel bars, bed stands, golf shafts, broom sticks, billiard cues, etc. or for lining for pipes and tubes and insulation purposes.

The sheet material from which the strips are cut may be laminated sheet stock with or without inlaid material and coloring matter between the sheets. Thus, tubes having fiber or flexible metal inlays may be formed and used to advantage.

The tubes after being formed and their seams sealed may be softened by heat and drawn through a shaping tube of slightly smaller diameter than the tube in which they were formed. By this means there is a drawing action which reduces the diameter of the tube and also smooths out any irregularities on the surface. This action also aids in obliterating any visible seam. Solid extruded rods may also be drawn through such a device to reduce their diameter and smooth their surface, thereby eliminating any necessity of grinding and polishing the small rods to obtain a smooth surface of the desired sized rod and to greatly reduce the necessity of grinding seams on large and heavy tubes and rods.

The blown or shaped articles made from the tubes or the tubes themselves may be filled with any suitable filling materials to form solid articles. Likewise, the tubes may be stretched over solid wooden or artificial material cores for umbrella and cane handles, etc.

It is to be understood that the foregoing detailed description and drawings are merely given by way of illustration and many alterations may be made therein without departing from the spirit of my invention.

Having described my invention what I desire to secure by Letters Patent is:

1. In a process for the production of hollow articles, the step which comprises drawing under longitudinal tension a heat softened strip of thermoplastic derivative of cellulose material through a cooled forming device adapted to cause the strip to be folded into the form of a hollow cylinder.

2. In a process for the production of hollow articles, the step which comprises drawing under longitudinal tension a heat softened strip of thermoplastic derivative of cellulose material through a cooled forming device adapted to cause the strip to be folded into the form of a hollow cylinder having abutting edges.

3. Process for the production of hollow articles from thermoplastic material, which comprises subjecting a strip of said material to a heated medium to soften the same and drawing under longitudinal tension the softened strip through a cooled forming device adapted to cause the strip to be folded into the form of a hollow cylinder having abutting edges.

4. Process for the production of hollow articles from thermoplastic derivative of cellulose material, which comprises subjecting a strip of said material to a heated medium to soften the same, drawing under longitudinal tension said softened strip through a cooled forming device adapted to cause the strip to be folded into the form of a hollow cylinder having abutting edges, opening said abutting edges, applying to said abutting edges a cementing agent and allowing said edges to close.

5. Process for the production of hollow articles from thermoplastic material, which comprises subjecting a strip of said material to a heated medium to soften the same, drawing under longitudinal tension said softened strip through a cooled forming device adapted to cause the strip to be folded into the form of a hollow cylinder having abutting edges, submerging said hollow cylinder in a solvent for the material, separating the abutting edges of said cylinder and then allowing the same to close.

6. Process for the production of hollow articles from thermoplastic material, which comprises drawing a heat softened strip of said material through a cooled forming device adapted to cause the strip to be folded into the form of a hollow cylinder having abutting edges, cementing said abutting edges and drawing the cylinder through a cooled forming device having a smaller diameter than the original hollow article.

7. Process for the production of hollow articles from thermoplastic derivative of cellulose material, which comprises drawing a heat softened strip of said material through a cooled forming device adapted to cause the strip to be folded into the form of a hollow cylinder having abutting edges, cementing said abutting edges and drawing the cylinder through a cooled forming device having a smaller diameter than the original hollow article.

8. A device for forming a hollow article from a strip of thermoplastic material, comprising means for heating said strip of material to soften the same, a shaping tube having means for cooling said strip of material, and means for drawing said strip through said shaping tube, said shaping tube being so constructed and arranged as to cause said strip to be folded into the form of a hollow cylinder.

9. Method of finishing and rendering substantially uniform the diameter of a tubular hollow article made of thermoplastic material, which comprises softening the article by treatment with a hot medium, stretching the softened article by drawing it under longitudinal tension through an artificially cooled rigid forming device having a smaller diameter than the original article and simultaneously with the drawing operation cooling the article sufficiently to harden it.

WILLIAM SALEMME.